US00RE42229E

(19) United States
(12) Reissued Patent
Ranzoni

(10) Patent Number: US RE42,229 E
(45) Date of Reissued Patent: Mar. 22, 2011

(54) POT

(75) Inventor: Francesco Ranzoni, Coccaglio (IT)
(73) Assignee: Bialetti Industrie S.p.A., Coccaglio (Brescia) (IT)

(21) Appl. No.: 29/349,704
(22) Filed: Jul. 6, 2010

Related U.S. Patent Documents

Reissue of:
(64) Patent No.: Des. 561,520
Issued: Feb. 12, 2008
Appl. No.: 29/267,641
Filed: Oct. 19, 2006

(30) Foreign Application Priority Data

May 18, 2006 (IT) ..... MI2006O0110

(51) LOC (9) Cl. ..... 07-02
(52) U.S. Cl. ..... D7/323
(58) Field of Classification Search ..... D7/323, D7/332–347, 354–366, 403–404; 126/9 R, 126/9 B, 2, 13, 25 R, 25 B, 26, 29, 37 R–38, 126/39 E, 40–41
See application file for complete search history.

(56) References Cited

U.S. PATENT DOCUMENTS

D445,298 S * 7/2001 DeBord et al. ..... D7/360
D455,040 S * 4/2002 Pannozzo et al. ..... D7/360
D523,687 S * 6/2006 Jian ..... D7/360

* cited by examiner

*Primary Examiner*—Catherine R Oliver
(74) *Attorney, Agent, or Firm*—Hogan Lovells US LLP

(57) CLAIM

The ornamental design for a pot, as shown and described.

DESCRIPTION

FIG. 1 is a front view of the pot;
FIG. 2 is a side view of the pot;
FIG. 3 is a second side view of the pot;
FIG. 4 is a top view of the pot;
FIG. 5 is a bottom view of the pot; and,
FIG. 6 is a perspective view of the pot.

1 Claim, 4 Drawing Sheets

Figure 1:
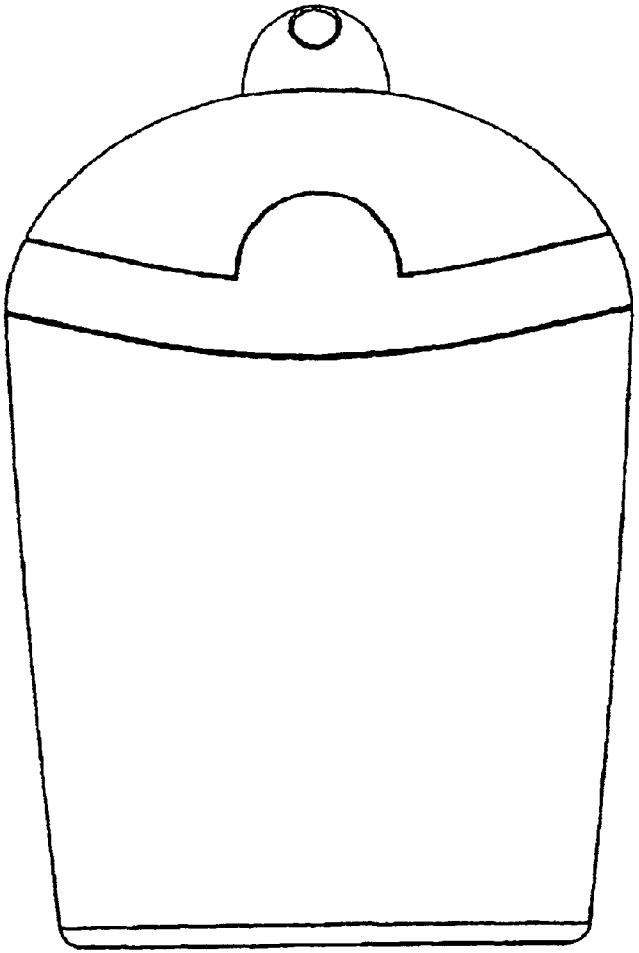
Figure 3:
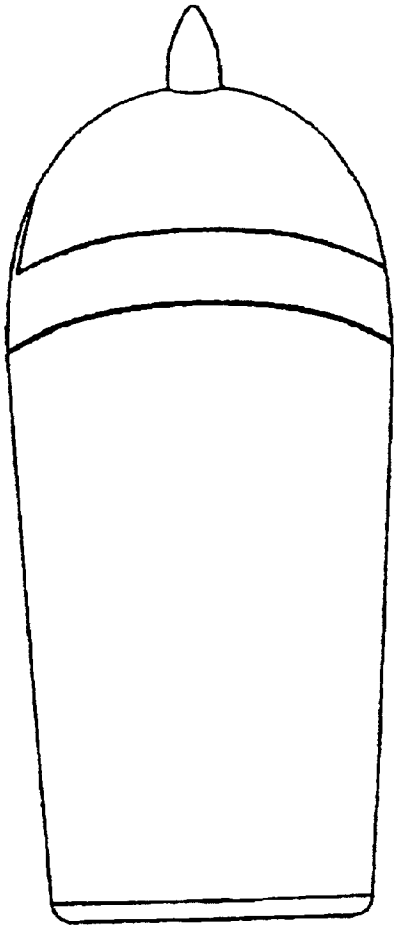
Figure 2:
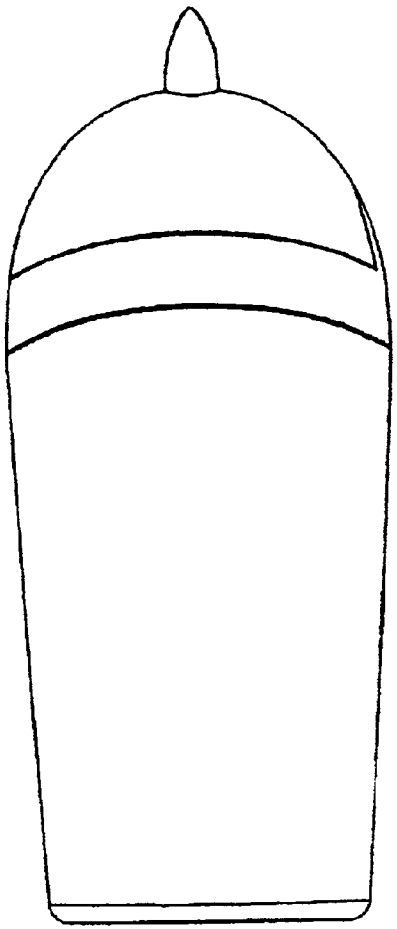
Figure 4:
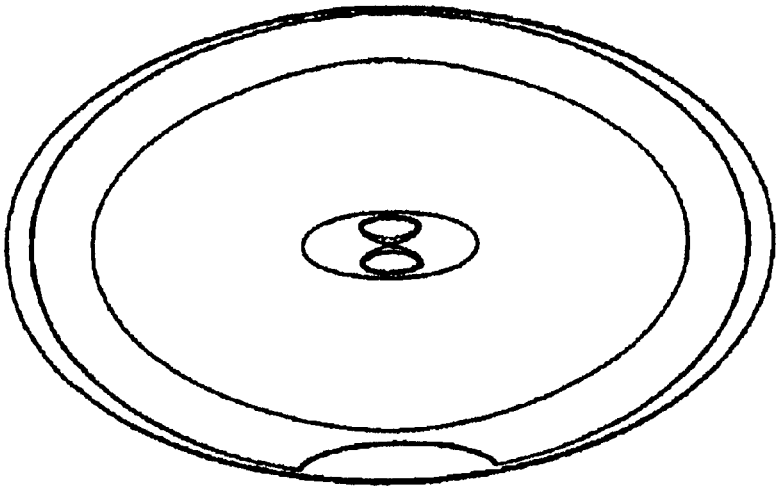
Figure 5:
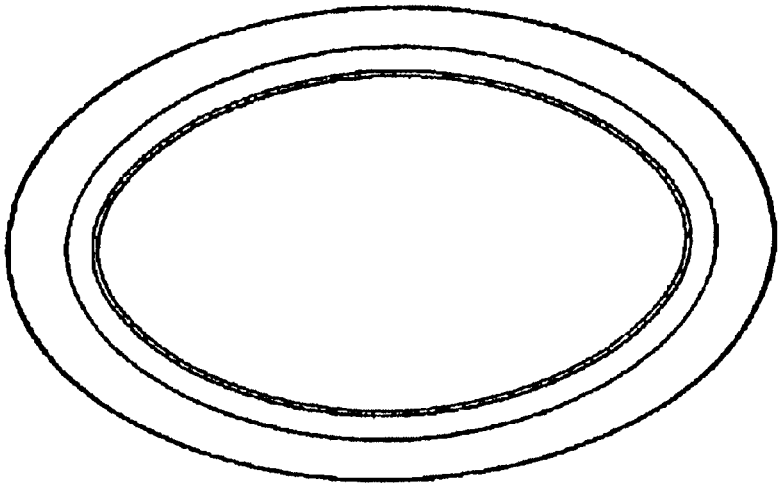
Figure 6:
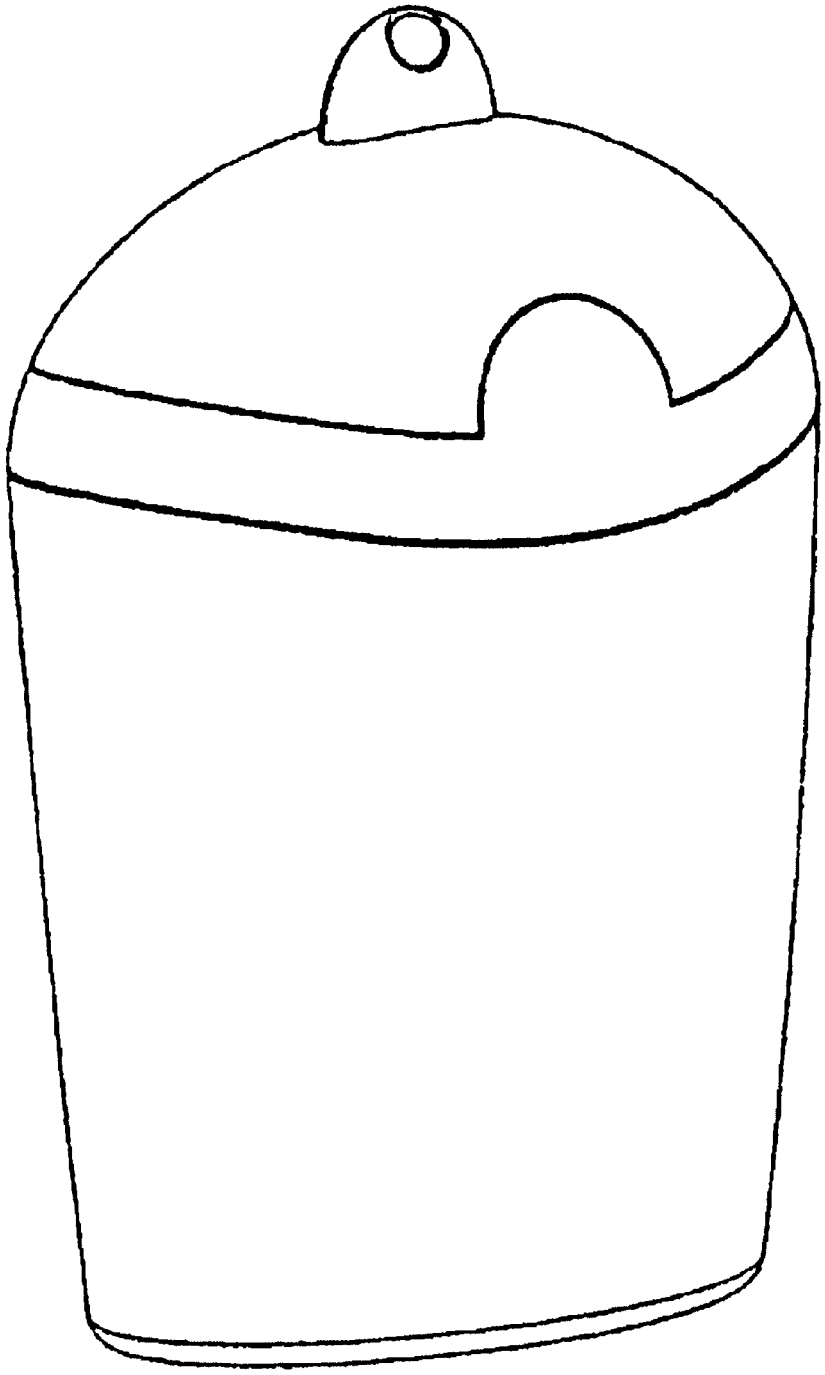

Matter enclosed in heavy brackets [ ] appears in the original patent, but forms no part of this reissue; matter printed in italics indicates the additions made by reissue.